Figure 1:
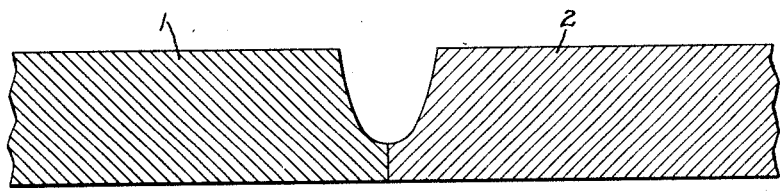

July 29, 1930.  C. L. IPSEN  1,771,961

METHOD OF UNITING THICK METAL PARTS BY ELECTRIC WELDING

Filed Oct. 16, 1928

Inventor:
Carl L. Ipsen,
by Charles E. Tullar
His Attorney.

Patented July 29, 1930

1,771,961

UNITED STATES PATENT OFFICE

CARL L. IPSEN, OF SCHENECTADY, NEW YORK, ASSIGNOR TO GENERAL ELECTRIC COMPANY, A CORPORATION OF NEW YORK

METHOD OF UNITING THICK METAL PARTS BY ELECTRIC WELDING

Application filed October 16, 1928. Serial No. 312,760.

My invention relates to an improved method of uniting thick metal parts by electric arc welding which involves a preliminary preparation of the edges of the parts to be welded and a special procedure in performing the welding operation.

In welding parts above one-eighth inch in thickness it is the practice to bevel or groove the abutting edges of the parts so that the heat generated by the arc might completely penetrate the edge portions of the parts and fuse them with the metal added during the welding operation. The bevel or groove in such cases is made to extend substantially through the parts and is of sufficient width to permit complete fusion being obtained at the bottom of the groove during the welding operation which is carried on from the grooved side of the parts. In order to prevent the arc from burning through the thin edges of the parts at the bottom of the bevel or groove the joint is backed up by a strip or bar which also serves to hold the molten metal of the joint in place until it solidifies.

In the past difficulty has been encountered in making the weld due to the detrimental effect on the arc of stray flux caused by the welding current. Depending upon the path the current takes in the work a field of indefinite strength and direction is produced in the vicinity of the arc which causes the arc to wander about and often go out thus producing poor welds. When the work parts are of a magnetic material the distribution of flux about the arc is not uniform due to the fact that the magnetic reluctance in front of the arc is greater than that behind the arc by reason of the open seam in front of the arc. This causes lines of force to pile up in front of the arc and deflect the arc backward often causing it to be shorted upon the material already deposited in the weld.

An object of my invention is to provide a method of welding by means of which the use of a backing strip or bar may be eliminated and by means of which the detrimental effects of stray flux on the welding arc during the major portion of the welding operation is eliminated.

According to my invention the work parts are grooved as in the past but not as deeply as heretofore so that the parts instead of having thin meeting edges at the bottom of the groove now have edges of substantial thickness. The thickness of metal at the bottom of the groove is such that a light weld made on the ungrooved side of the parts will not fully penetrate the metal at the bottom of the groove. In making the weld the grooved parts are clamped in adjusted relationship with the thickened edges abutting and their edges are then welded together throughout their length by means of an arc applied to the sides of the parts opposite the groove. This weld entirely closes the air gap between the parts and at the same time provides a uniform backing for subsequent welds which are made on the other side of the work in the groove provided for that purpose. The initial weld thus acts as a backing up weld for the additional welds that are made by traversing an arc along the groove as many times as is necessary to complete the joint by fusing the walls of the groove with the metal of an electrode or filler rod used to fill the groove and complete the joint. In order to obtain a joint of greatest strength it is necessary that the first weld made in the groove form an intersection with the backing-up weld above referred to.

The backing-up weld completes an electric circuit of low resistance in the work at the point of welding through which the welding current tends to flow and thus establish a definite field in place of the stray fields which would be caused by the current taking devious paths through the work as they would if a definite path were not thus provided. Furthermore in the case of magnetic material the backing-up weld makes the reluctance of the joint uniform at the point where the arc is formed and where the current enters the work so that the flux due to the welding current at this point is likewise of uniform intensity and thus has no tendency to deflect the arc backward along the seam being welded. The elimination of magnetic troubles and the uniform backing thus attained greatly improves the quality of the weld and it is possible to produce by my method of welding joints having greater strength than it is possible to produce by methods of welding heretofore employed.

My invention will be better understood from the following description when considered in connection with the accompanying drawing and its scope will be pointed out in the appended claims.

Figure 2:
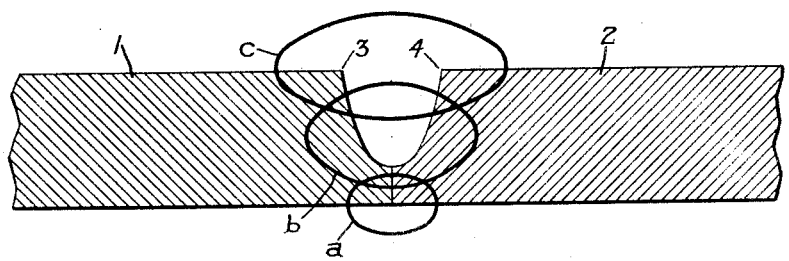

In the drawing Fig. 1 shows a section of the work parts at the joint illustrating the manner in which the edge portions of the parts are prepared prior to welding and Fig. 2 illustrates the manner of making the welded joint where two welding operations are sufficient to fill the groove and complete the joint between the parts.

The edges of the work parts 1 and 2 are shaped substantially as illustrated in Fig. 1 prior to performing the welding operation. The edges of the work parts may be prepared individually before they are assembled as illustrated or the two parts may be assembled and then grooved along the seam or joint. It is immaterial what means are employed for securing the desired shaping operation, pressing, milling, molding, chipping, grinding, etc. being suitable means. It is to be noted that the groove is cup-shaped in section and narrower at the top than would be the case if the edge portions were beveled to form a V-groove which would permit the same freedom at the bottom of the V during welding as is permitted in the groove illustrated. It will also be noted that the groove does not extend substantially through the parts leaving thin edges at the bottom of the groove that may be easily fused by an arc directed thereon from within the groove but that it is spaced from the ungrooved surface of the parts a substantial distance so that thick edge portions are formed at the bottom of the groove. These edges are of such thickness that a light weld will not penetrate all the way through them. Generally these edges will be about one-eighth of an inch in thickness.

The proportions of a groove found suitable for welding half inch plate material are as follows: The groove is $\tfrac{3}{8}$ inch deep, $\tfrac{3}{8}$ inch wide at the top, the side walls of the groove curved on about $\tfrac{1}{2}$ inch radius and the bottom of the groove on about $\tfrac{1}{8}''$ radius. Of course it is apparent that variations may be made in the shape and configuration of the groove without departing from my invention so long as sufficient metal be left at the bottom of the groove so that the particular welding operation about to be described may be performed.

The welding operation is as follows: With the parts clamped in the position illustrated in Fig. 1 weld $a$ is made by operating on the parts on their ungrooved side at the joint. This weld should not penetrate all the way through the metal at the bottom of the groove. The weld $b$ is next made from within the groove on the other side of the work parts. This weld should penetrate the work parts sufficiently to intersect weld $a$. If the parts are of sufficient thickness this second weld will only partly complete the joint. In the case of half inch stock, for example, this weld should fill the groove up to within $\tfrac{1}{16}$th to $\tfrac{1}{8}$th inch of the top of the groove. The joint is completed by such additional welds as are necessary in view of the thickness of the parts. In the case of half inch stock the joint would be completed by a third weld $c$. This weld should fill the remainder of the groove and produce a bead on top of the work about $\tfrac{1}{2}$ inch to $\tfrac{3}{4}$ inch wide and about $\tfrac{1}{16}$ to $\tfrac{1}{8}$ inch high. It is important that the sharp edges 3 and 4 of the groove be left intact until the final weld is made in order to obtain good penetration and a sound joint.

Backing-up weld $a$ may be made by depositing a bead of weld metal along the seam as illustrated or by fusing the parts without the addition of more metal but the remaining welds are made by depositing beads of weld metal from a fusible electrode or from a filler rod fed into the arc during the welding operation. In the case of parts of greater thickness than the $\tfrac{1}{2}$ inch parts illustrated in the drawing and described above it will be necessary to lay down a greater number of beads of weld metal than in the weld illustrated in order to fill the groove but in such cases the technique is essentially the same as described above.

The welding may be done by hand or by automatic means. The beads of metal may be placed in the groove progressively by a plurality of automatic means traversed along the seam in unison or by a single automatic means which is moved back and forth along the length of the seam. It is also possible by grouping a plurality of arc and by having them operate on the same portion of the groove at the same time to deposit a single bead which will completely fill the groove in one welding operation.

What I claim as new and desire to secure by Letters Patent of the United States is:

1. The method of electric arc welding heavy metal parts which includes grooving the parts at the joint to produce abutting edge portions of such thickness that a light weld will not fully penetrate the same, uniting said parts along said edge portions on the side of the parts opposite the groove by a light backing-up weld and then uniting the parts on their opposite side along the length of the groove by a weld formed by fusing the walls of the groove and filling the groove with molten metal.

2. The method of uniting metallic parts by means of the electric arc which includes the steps of shaping the edges of the parts to be welded to form in one side of the parts a portion of a groove the bottom of which is spaced from the other side of the parts a sufficient distance to form a thickened edge, placing the thickened edge of the parts together to form a welding groove, uniting the parts first on the ungrooved side by a continuous weld that does not fully penetrate the thickened edges and then welding the parts on the other side by fusing the walls of the groove and filling the groove with molten metal to complete the joint between the parts.

3. The method of uniting metallic parts by means of the electric arc which includes the steps of placing the edges of the parts in engagement, forming in one side of the parts at the joint a groove spaced from the other side of the parts, clamping the parts in adjusted relationship, uniting the parts first on the ungrooved side by a continuous weld that does not fully penetrate the metal at the bottom of the groove, continuing the welding operation by uniting the parts on the grooved side by a weld intersecting said first weld and completing the joint by fusing the walls of the groove and filling the groove with molten metal.

4. The method of uniting metallic parts by means of the electric arc which includes the steps of shaping the edges of the parts to be welded to form in one side of the parts a portion of a groove the bottom of which is spaced from the other side of the parts a greater distance than can be fully penetrated by a light weld, placing the parts together to form a welding groove, uniting the parts on the ungrooved side by a light continuous weld and then completing the welding operation by fusing the walls of the groove and filling the groove with molten metal.

5. The method of uniting metallic parts by means of an electric arc which includes the steps of cutting away the edges of the parts to be welded to form parallel or substantially parallel walls with thickened edges extending from the lower sides, assembling the parts with their thickened edges abutting each other to form a narrow welding groove, starting the welding operation by depositing on the ungrooved sides of the parts a bead of weld metal which does not fully penetrate said thickened edges, continuing the welding operation by fusing the side walls of the groove and filling the groove with molten metal to produce a weld that intersects said first weld at the bottom of the groove and completing the weld by depositing a single bead of metal fused with the edges of said groove and with the metal deposited in said groove.

6. The method of uniting metallic parts by means of the electric arc which includes the steps of shaping the edges of the parts to be welded to form in one side of the parts a portion of a groove the bottom of which is spaced from the other side of the parts at least one-eighth of an inch uniting the parts first on the ungrooved side by a continuous weld and then completing the operation by welding the parts on the grooved side by fusing the walls of the groove and filling the groove with molten metal.

In witness whereof, I have hereunto set my hand this 15th day of October, 1928.

CARL L. IPSEN.